United States Patent [19]

Miller

[11] Patent Number: 5,316,828

[45] Date of Patent: May 31, 1994

[54] REINFORCED FLUTED MEDIUM AND CORRUGATED FIBERBOARD MADE USING THE MEDIUM

[76] Inventor: Ray R. Miller, 8816 Warren Dr., Gib Harbor, Wash. 98335

[21] Appl. No.: 691,378

[22] Filed: Apr. 25, 1991

[51] Int. Cl.⁵ .............................................. B32B 3/28
[52] U.S. Cl. ..................... 428/182; 428/184; 428/186; 428/195
[58] Field of Search ............... 428/182, 184, 174, 186, 428/178, 141, 192, 195, 343; 52/795, 801

[56] References Cited

U.S. PATENT DOCUMENTS 2,973,295  2/1961  Rodgers, Jr. ..................... 154/100
3,691,002  9/1972  Blandy .............................. 161/137

OTHER PUBLICATIONS

Chow, D. K. Design of cost-effective flute features in corrugating medium. *Tappi Journal*, pp. 126–128, Oct. 1986.

Liu, Jen y. Flat-crush failure mechanism of corrugated fiberboard. *Journal of Applied Mechanics*, 53 (9): 602–608 (1986).

Sofinowski, John R. Trends in high-speed single facer design. *Tappi Journal*, pp. 43–47, Oct. 1987.

*Primary Examiner*—Donald J. Loney
*Attorney, Agent, or Firm*—Keith D. Gehr

[57] ABSTRACT

Fluted corrugating media of unconventional configuration and the methods for their manufacture for use in corrugated fiberboard are described. These media may be asymmetrical in configuration or have very sharply angled flute tips. The new configurations are formed using at least one secondary corrugating stage to prevent tearing during formation. The flat crush strength of the medium may be enhanced by applying parallel lines of adhesive transversely to the flutes on at least one side. These adhesive lines at least partially fill the valleys of the flutes along the lines.

8 Claims, 4 Drawing Sheets

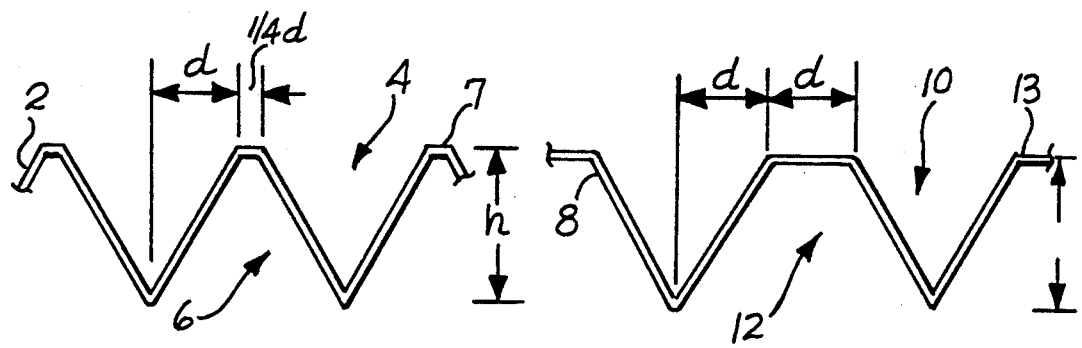
*Fig.1*  *Fig.2*
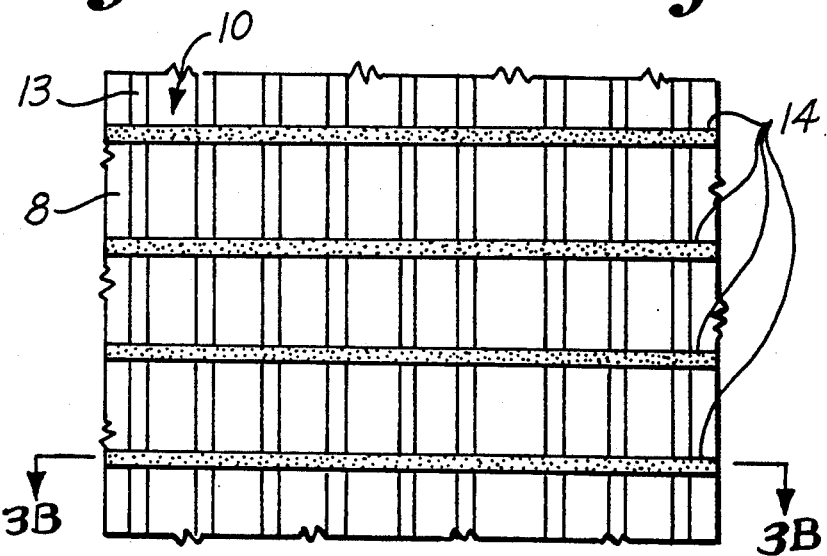
*Fig.3A*
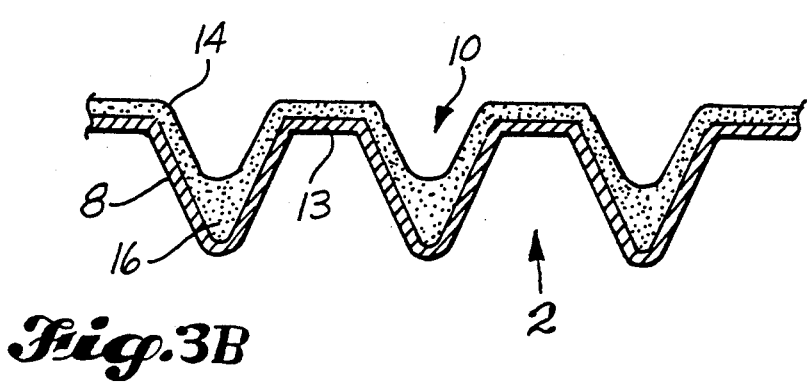
*Fig.3B*

REINFORCED FLUTED MEDIUM AND CORRUGATED FIBERBOARD MADE USING THE MEDIUM

BACKGROUND OF THE INVENTION

In a corrugated fiberboard carton wall, the primary function of the fluting medium is to space apart the face liners and provide resistance to flat crush loads normal to the planes of the face liners. This flat crush resistance also plays a part in resisting end loading on the box wall in that flat crush resistance helps resist buckling due to column loading on the wall.

Conventional fluting patterns suffer an inherent shortcoming in that increased flute height, which is desired for increased wall thickness and resistance to buckling, reduces flat crush resistance because of the greater unsupported length of the medium from one face to the other. In addition to column height of the medium, flute tip radius and flute angle affect the wall strength. A discussion of the effect of flute tip radius and flute angle on strength can be found in an article by D. K. Chow, Design of cost effective flute features in corrugating medium, Tappi Journal, pp 126–128, October 1986.

Variability of flute tip radius and flute angle in conventional practice is limited by the conditions in the labyrinth formed by converging corrugator rolls as the flutes are being formed in the fluting (or corrugating) medium. A discussion of this factor may be found in an article by John R. Sofinowski, Trends in high-speed single facer design, Tappi Journal, pp 43–47, October 1987. This labyrinth creates a distinct limitation on the flute profile obtainable in presently known corrugators.

A discussion of the behavior of symmetrical fluting under flat crush loading is found in an article by Jen Y. Liu, Flat-crush failure mechanism of corrugated fiberboard, Journal of Applied Mechanics, 53 (9): 602–608 (1986). FIG. 12 in the article is especially pertinent.

Rodgers, Jr., in U.S. Pat. No. 2,973,295, teaches a corrugated fiberboard in which one or both sides of the fluted medium are entirely filled with an expanded foam. This is done to improve dry strength and crush resistance.

Blandy, in U.S. Pat. No. 3,691,002, shows a corrugated fiberboard strengthened by coating all interior surfaces with a liquid resin to increase stiffness and crush resistance.

SUMMARY OF THE INVENTION

The present invention incorporates new features and the methods of incorporating them which improve flat crush resistance of a corrugated container board. These indirectly provide improvement in end crush resistance and reduce the weight of fiber required for given strength specifications.

One preferred feature of the invention is the use of modified flute configurations which may include asymmetrically formed flutes and flutes having a tip angle reduced to a degree not contemplated in prior products.

Another feature of the invention includes a reinforcing material applied transversely across the flutes in spaced apart parallel lines. The reinforcing material at least partially fills the valleys of the flutes along the lines of application. This reinforcing material is preferably also an adhesive that serves to bond the fluted medium to the linerboard. However, it may be any suitable resinous, polymeric, or similar material that may be applied in liquid form and that will subsequently set up to a solid. The bands of reinforcing material are preferably applied to only one side of the fluted medium, as will later be described in detail, but they may also be applied to both sides of the fluted medium. In the most preferred form of the invention, the bands are applied across the narrower flute valleys of an asymmetrically fluted medium.

The invention includes methods and apparatus for producing the modified flute configurations. These involve the use of one or more additional corrugating rolls in conjunction with the normal pair of rolls. The additional rolls serve to modify the flute cross sectional shape into patterns that are not possible to obtain with a single roll pair.

It is an object of this invention to provide a stronger corrugated fiberboard, especially in resistance to flat crush loading.

It is another object to provide a carton wall design in which resistance to flat crush loading is enhanced by bands of reinforcement placed within the flute valleys.

It is a further object to provide a corrugated fiberboard having a reduced fiber content for any given flat crush strength specification.

It is also an object to provide two stage corrugating methods which enable wall designs not heretofore obtainable to be produced.

It is still another object to provide corrugated fiberboard panels having high flat crush strength for end uses other than cartons.

These and many other objects will become readily apparent to those skilled in the art upon reading the following detailed description taken in conjunction with the drawings.

BRIEF DESCRIPTION OF THE DRAWINGS

FIG. 1 shows a stylized asymmetrical cross sectional pattern of fluted medium with a ratio of cross sectional area of the flutes opening to one face to those opening to the other face of 1.25.

FIG. 2 shows another example similar to FIG. 1 in which the ratio of respective cross sectional areas is 2.0.

FIG. 3A shows a plan view of beads of reinforcing material applied to the fluted medium transverse to the flutes.

FIG. 3B is a view similar to FIG. 3A but in cross sectional elevation.

DETAILED DESCRIPTION OF THE PREFERRED EMBODIMENTS

Figure 4:
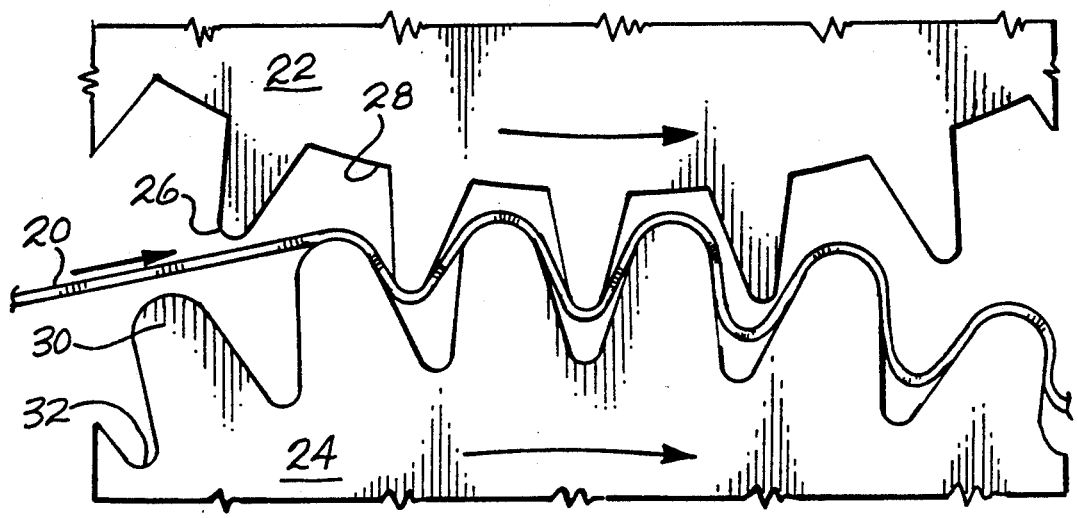
FIG. 4 shows the nip portion of a mated pair of corrugator rolls with respectively different flute tip radii for the production of an asymmetrically fluted medium.

FIGS. 1 and 2 illustrate two examples of an asymmetrical flute pattern of fluted medium for use in manufacturing corrugated fiberboard for cartons or other uses. In FIG. 1 the medium 2 is corrugated so that the valleys 6 have 1.25 times the cross sectional area of valleys 4. Alternatively it could be said that valleys 4 have 0.8 times the cross sectional area of valleys 6. This pattern is asymmetric due to the broadened flute tips 7 on one side of the fluted medium. In similar fashion as seen in FIG. 2, corrugated medium 8 has valleys 12 with a cross sectional area 2.0 times that of opposite side valleys 10 by virtue of broadened flute tips 13.

A primary objective of the asymmetric flute pattern is to present one face with reduced cross sectional area of flute valleys. This facilitates reinforcement of the valley walls with a reduced quantity of adhesive material. Stated another way, narrower valleys require less adhesive for reinforcement.

FIGS. 3A and 3B show plan and cross sectional elevation views of an example of the use of parallel lines of reinforcing material 14 applied transversely across the flute valleys 10 and flute tips 13 of a corrugated medium similar to that of FIG. 2. This reinforcing material can also be an adhesive that will serve to bond the fluted medium to a single face liner sheet, not shown. The reinforcing material may only partially fill the flute valleys along the lines of application, as shown in the drawing at 16, or it may fill them to the tops. However, it is understood that the reinforcing material is present only in the near vicinity of the lines of application and does not flow out so that it is present in the entire length of the flute valleys. While the reinforcing lines may be applied to both sides of the corrugated medium it is generally preferable to apply it to only one side. Where an asymmetrically fluted medium is employed the reinforcing material will normally be applied only to the side in which the flute valleys have the smaller cross sectional area.

FIG. 4 shows a detail of the nip portion of a mated pair of corrugator rolls 22, 24 in which the rolls have respectively different radii on the flute tips in order to produce asymmetrically patterned flutes in corrugating medium 20. Roll 22 has relatively narrow flute tips 26 and broad valleys 28 whereas roll 24 has the opposite configuration, relatively broad tips 30 and narrow valleys 32. It is not essential for the mating tips and valleys to be completely conforming as is seen in the different shapes of valleys 28 and tips 30.

Figure 5:
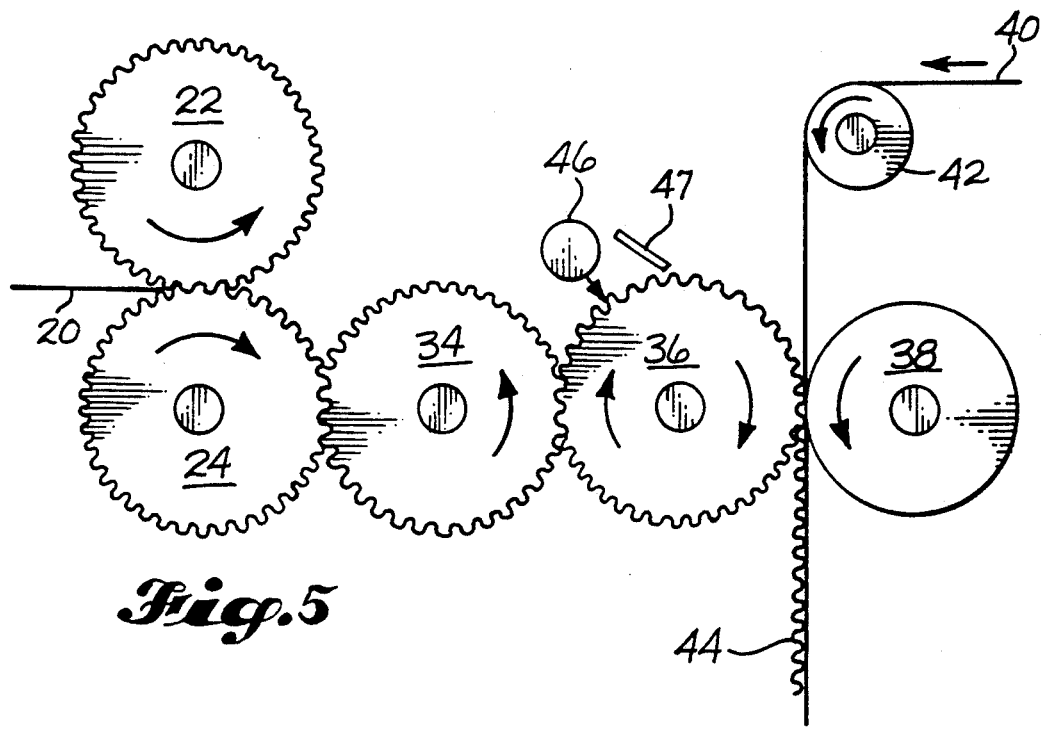
FIG. 5 shows a schematic end elevation view of a two stage corrugating machine to produce fluted medium with an asymmetric flute pattern.

FIG. 5 shows a schematic elevation view of a two stage corrugator designed to produce an asymmetric flute pattern. This is shown with an initial corrugating stage employing rolls similar to rolls 22 and 24 of FIG. 4 although it is not essential to use this exact configuration. Two stages of corrugation are required whenever the desired final flute pattern is beyond the capability of a single stage two roll corrugator. The corrugating medium 20 is initially corrugated in the nip between rolls 22 and 24 to a desired first stage corrugating pattern. The initially corrugated medium transfers from roll 24 to roll 34 and then to the nip between rolls 34 and 36. After being formed to its final configuration in this nip the fluted medium is combined at roll 38 with a single face liner 40 advancing over idler roll 42. Adhesive is applied to the finally formed flutes by a spreader, schematically shown at 46. This may be optionally partially wiped into the flute valleys by a doctor blade 47. The adhesive may be applied conventionally but preferably it is applied as a reinforcement in the valleys of lesser cross sectional area as shown in FIGS. 3A and 3B. The single faced board 44 is treated conventionally from this point.

Figure 6:
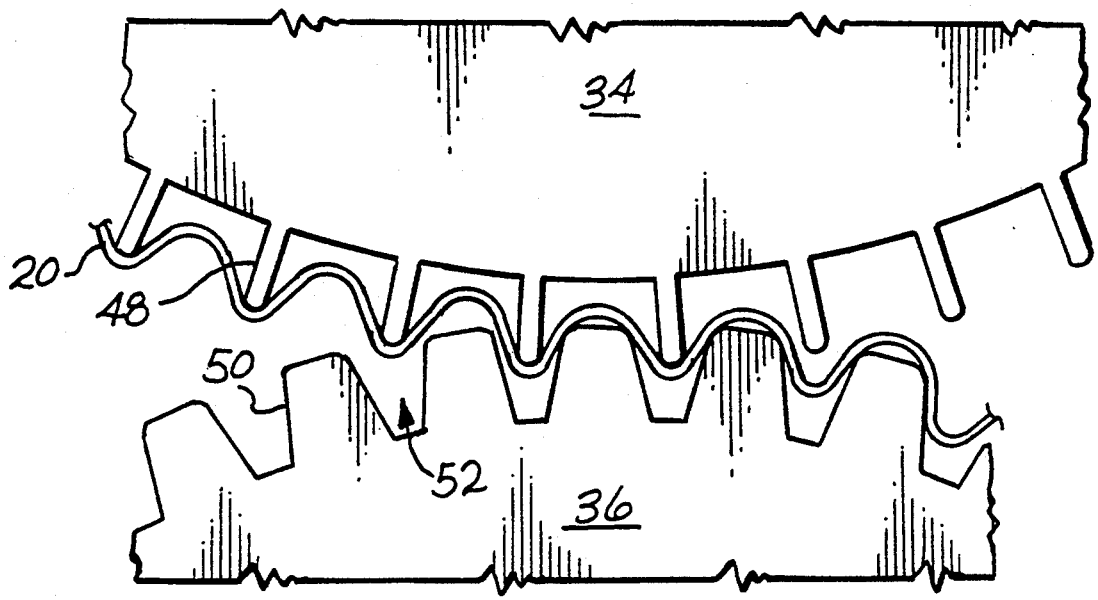
FIG. 6 shows the nip portion of the final corrugating roll pair of FIG. 5.

It will be noted in FIG. 6 that roll 34 has sharply angled flute tips 48 and roll 36 has broad flute tips 50 with narrower valleys 52 to hold the final asymmetrically fluted medium in the desired configuration to receive the adhesive beads and single face liner sheet. The virtue of the second stage of corrugation between rolls 34 and 36 is that a deeper, more sharply angled flute shape is attainable. Since the medium is already corrugated as it approaches the nip with roll 34, the flute tips on roll 34 can be longer, in terms of total flute height of the fluted medium, than is possible when a flat sheet of medium approaches the labyrinth of a single stage corrugator.

Rolls 24, 34, and 36 may be equipped with conventional vacuum, positive air pressure, and/or mechanical means to retain the medium on the rolls and assist in its transfer between rolls. Following the addition of adhesive to the medium the single face and double face liners are added in a wholly conventional way.

FIG. 6 shows a more detailed view of the nip between rolls 34 and 36 and of the transfer of the initially corrugated medium from one to the other. This illustrates well how the medium flutes are shaped on roll 36 prior to receiving the adhesive and single face liner. The narrow rib-like flutes 48 of roll 34 press the initially fluted medium 20 into the narrow valleys 52 of roll 36. Roll 36 has relatively wider flute tips 50 so that an asymmetrically fluted medium is ultimately produced.

Figure 7:
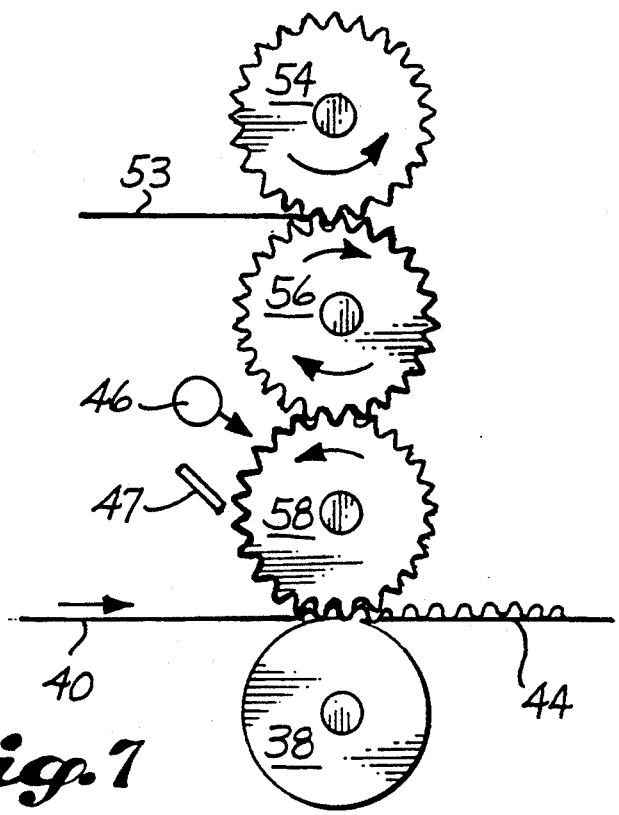
FIG. 7 shows a schematic elevation view of a two stage corrugating machine to produce fluted medium having sharply angled flutes.
Figure 8:
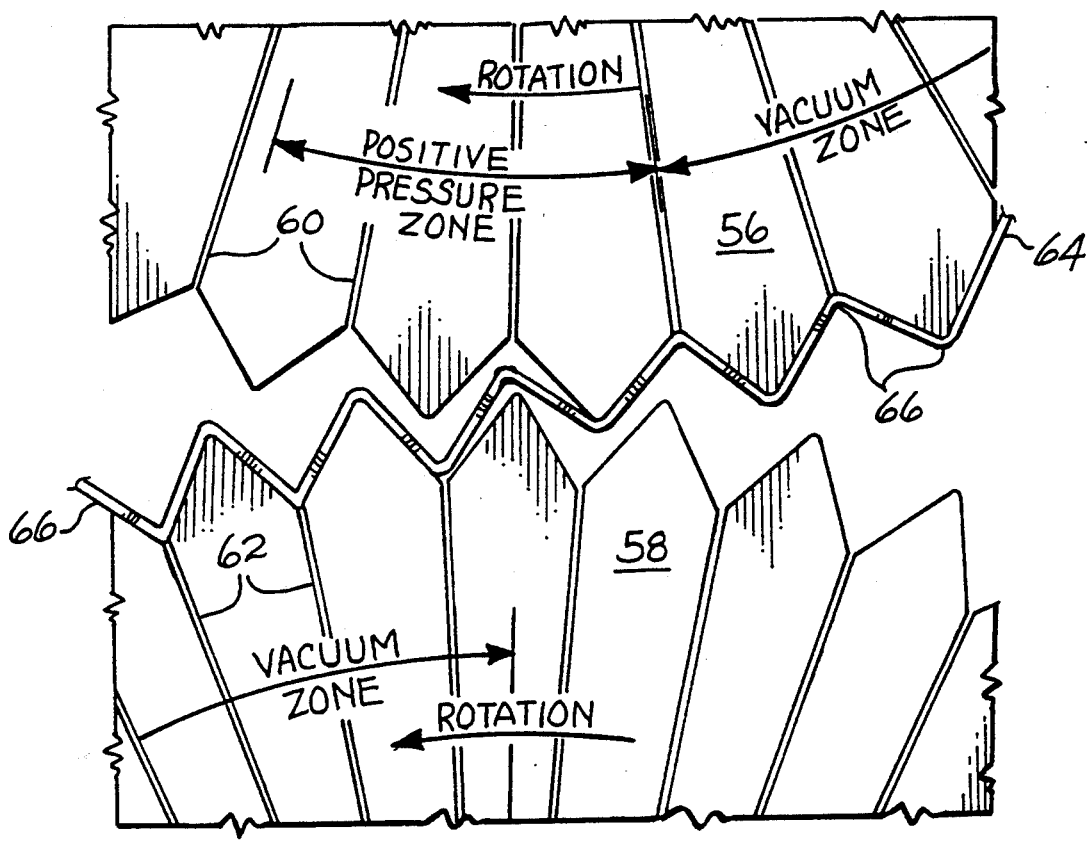
FIG. 8 shows detail of the nip section between the second and third corrugating rolls of FIG. 7.

FIGS. 7 and 8 show a two stage corrugator designed to produce an essentially symmetrically fluted medium having flute tips more sharply angled than can be produced in a single stage two roll corrugator. The medium 53 is initially corrugated in the nip between rolls 54 and 56 to a desired first stage flute pattern. In this case the desired first stage flute pattern will have a flute tip radius sufficiently small to define the lines of flexing of the medium required in the following pitch reduction stage. These should have the sharpest (or smallest) flute angle reasonably obtainable in the first stage, limited only by the characteristics of the corrugating medium and the labyrinth of the machine. The transfer of the medium from roll 56 to roll 58 involves a reduction in the flute pitch distance and a corresponding increase in flute height. To accomplish this pitch reduction, roll 58 has a lesser distance between the flute tips than does roll 56. Roll 58 must operate at a correspondingly lower tip speed than roll 56 such that the flutes of the two rolls are synchronized in the nip. The transfer of the medium from roll 56 to roll 58 is aided by positive air pressure on roll 56, applied through orifices 60, and vacuum on roll 58, exerted through orifices 62. The initially corrugated medium 64 will flex or hinge along the relatively sharp flute tips 66 to accomplish the transfer into the flutes of roll 58 and assume the new closer tip-to-tip pitch 66 formed on roll 58. It is essential that the flute tips coming to roll 58 have a sufficiently small radius so that the flute tips can readily act as hinge or fold lines to enable the medium to conform to roll 58. It is quite within the scope of this embodiment of the invention to add an additional corrugating roll or rolls, not shown, following roll 58 to effect additional reduction in flute pitch distance.

Having thus described the best mode known of practicing the invention, it will be apparent to those skilled in the art that many variations can be made in the embodiments exemplified without departing from the spirit of the invention. Thus, the invention should be consid- ered as being limited only as it is defined by the following claims.

I claim:

1. A fluted medium for corrugated fiberboard which comprises a plurality of discrete spaced apart lines of reinforcing material oriented transversely to the flutes on at least one surface of said medium, said reinforcing material at least partially filling the valleys of the flutes only along said spaced apart lines, the reinforcing material being absent in the portion of the valleys between said lines, whereby the flat crush strength of corrugated board made with said medium is increased in comparison to board lacking the lines of reinforcing in the flute valleys.

2. The fluted medium of claim 1 in which the reinforcing material comprises an adhesive.

3. The fluted medium of claim 1 further combined with at least one sheet of adhesively bonded linerboard to form a corrugated board.

4. The fluted medium of claim 2 further combined with at least one sheet of linerboard to form a corrugated board, the adhesive reinforcing material further serving to bond the fluted medium to the linerboard along the lines of reinforcement.

5. The fluted medium of claim 1 which is asymmetrically fluted so that the ratio of cross sectional area of the flute valleys on opposite sides of the fluted medium is other than 1.0.

6. The fluted medium of claim 2 which is asymmetrically fluted so that the ratio of cross sectional area of the flute valleys on opposite sides of the fluted medium is other than 1.0.

7. The fluted medium of claim 3 which is asymmetrically fluted so that the ratio of cross sectional area of the flute valleys on opposite sides of the fluted medium is other than 1.0.

8. The fluted medium of claim 4 which is asymmetrically fluted so that the ratio of cross sectional area of the flute valleys on opposite sides of the fluted medium is other than 1.0.

* * * * *